United States Patent [19]
Jarrin et al.

[11] Patent Number: 5,324,779
[45] Date of Patent: Jun. 28, 1994

[54] CROSS-LINKED COMPOSITIONS BASED ON POLYETHYLENE AND CROSS-LINKED MATERIALS DERIVED FROM THEM

[75] Inventors: Jacques Jarrin; Gaëtan Serpe, both of Rueil-Malmaison; Francois Dawans, Bougival, all of France

[73] Assignee: Institut Francais Du Petrole, Rueil Malmaison, France

[21] Appl. No.: 778,329

[22] Filed: Oct. 21, 1991

[30] Foreign Application Priority Data

Oct. 19, 1990 [FR] France ................. 90 13077

[51] Int. Cl.$^5$ .............. C08L 23/26; C08L 29/04; C08L 33/08; C08L 33/02
[52] U.S. Cl. ..................... 525/57; 525/66; 525/72; 525/74; 525/78; 525/80; 525/100; 525/103; 525/106; 525/207; 525/221; 525/227; 525/240; 525/431
[58] Field of Search ............ 525/57, 66, 103, 106, 525/283, 72, 74, 78, 80, 100, 103, 106, 207, 221, 227, 240, 431; 264/211.24

[56] References Cited

U.S. PATENT DOCUMENTS

| | | | |
|---|---|---|---|
| 3,646,155 | 2/1972 | Scott | 525/285 |
| 4,526,930 | 7/1985 | Keogh | 525/106 |
| 4,613,646 | 9/1986 | Sandvick | 525/103 |
| 4,857,250 | 8/1989 | Gale et al. | 264/211.24 |
| 5,075,382 | 12/1991 | Ohmae et al. | 525/285 |

Primary Examiner—James J. Seidleck
Assistant Examiner—W. R. H. Clark
Attorney, Agent, or Firm—Millen, White, Zelano & Branigan

[57] ABSTRACT

Crosslinkable compositions with a polyethylene base are described which comprise a major proportion, for example 65 to 95% by weight, of at least one polymer selected from the polyethylenes grafted by a silane and ethylene-triethoxyvinylsilane copolymers; a minor proportion, for example, from 5 to 35% by weight, of at least one polymer selected from the hydrophilic polymers which are incompatible with ethylene polymers; as well as, added to the total weight of polymers (a) and (b), a small proportion, for example, from 1 to 10% by weight, of at least one polymer selected from the copolymers and the terpolymers with an ethylene base to react chemically with said incompatible hydrophilic polymer; and a catalytic proportion, for example of 0.001 to 0.3% by weight, of at least one hydrolytic catalyst. These crosslinkable compositions can be shaped by extrusion, extrusion blow-molding or injection molding and then crosslinked by heating in the presence of water.

16 Claims, No Drawings

CROSS-LINKED COMPOSITIONS BASED ON POLYETHYLENE AND CROSS-LINKED MATERIALS DERIVED FROM THEM

BACKGROUND OF THE INVENTION

The invention relates to the field of crosslinked polyethylenes which can be used for forming various articles such as sections, tubes, containers (tanks or bottles), injection-molded articles, sheets, films, etc. The crosslinking imparts to the articles produced from these materials mechanical properties (creep resistance, impact resistance) and physico-chemical properties (resistance to gases under pressure, insolubility in hydrocarbons) which are better than that observed for the same articles produced from polyethylenes which are not cross-linked.

Various methods of polyethylene crosslinking have been described in the prior art.

For example, crosslinking by exposure to radiation is known. This type of treatment is performed at ambient temperature and the dose of radiation is linked to the level of crosslinking which is desired. However, the depth of penetration of the radiation into the material limits the thickness of the crosslinked objects crosslinked by this process to about a few millimeters.

Also, crosslinking by peroxide is known, which calls for a prior mixing of the base polyethylene with a carefully selected radical initiator and possibly additives, and then transformation of the mixture in an extruder, for example at a temperature below the decomposition temperature of peroxide, and finally continuous crosslinking of the object at the peroxide decomposition temperature in an oven under nitrogen or under steam or even in a molten salt bath. This process is applied beneficially to the crosslinking of low density polyethylene which is extruded at temperatures on the order of 140° C., which make it possible to avoid decomposition of the peroxide in the extruder, crosslinking at around 180° C. then being fairly rapid. On the other hand, the crosslinking of high density polyethylene objects requires peroxides which are stable at around 180° C. (the usual extrusion temperatures for the high-density polyethylenes), which then decompose at about 250° C. to initiate crosslinking.

These higher temperatures sometimes pose problems of plant maintenance, of energy consumption and of possible deterioration of the objects when the thicknesses are substantial and require high wall temperatures in order to increase the rate of the transfer of heat necessary for decomposition of the peroxide through the thickness.

Finally, the so-called "silane" process of crosslinking is known which consists, in a first stage, in grafting vinyltriethoxysilane on polyethylene in the presence of peroxide, for example, during a granulation operation, then in shaping the polyethylene silane mixed with a hydrolytic catalyst (for example, dibutyltin dilaurate) of silanol groups, for example during an extrusion or an injection. Finally, bringing the transformed product into contact with the liquid water or steam at around 90° C. results in a hydrolysis of the Si—O—CH₃ groups and in a condensation according to the following reactions:

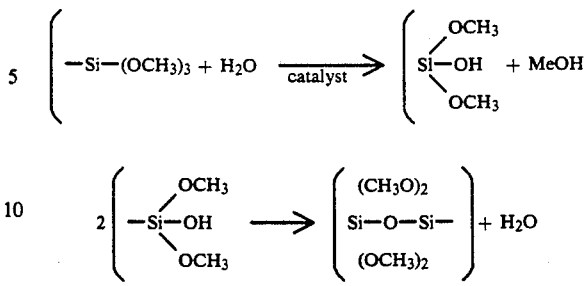

This process applies both to low density polyethylenes and to high density polyethylenes. The rate of crosslinking depends upon the catalyst content, the hydrolysis conditions (water content, temperature) and above all the thickness of the article.

The diffusion of water through the silane-grafted polyethylene article is slow in fact, even at 95° C., and crosslinking times (as a rough approximation) vary with the square of the thickness of the article. Times on the order of a few days to 1 or 2 weeks may be necessary for crosslinking articles having thickness of 5 to 15 mm.

The products thus produced have a high permeability to hydrocarbons: it is on the same order as that of non-crosslinked polyethylenes.

To increase the rate of crosslinking of the polyethylenes grafted to silane, it is possible to increase the catalyst contents, but beyond a certain threshold the catalyst no longer has any effect on the reaction kinetics. Similarly, an increase in the temperature or the degree of moisture increases the reaction rate. That is why industrial installations for crosslinking polyethylenes grafted to silane operate at 90° or 90° C. with either liquid water or with saturated steam.

Under these conditions, an increase in the relative humidity is no longer possible and an increase in the temperature would require the installation of pressurized autoclaves for providing higher temperatures but, in any case not able to exceed about 110° to 130° C. according to the melting temperature of the polyethylene. The gain in the crosslinking reaction velocity would then be small compared to the investments required.

Increasing the rate of crosslinking can also be done by increasing the rate of diffusion of the water through the thickness of the article. For example, patent DE 2444829, which describes the incorporation in polyethylene grafted to silane of compounds able to generate water by chemical reaction of acids coming from decomposition of the peroxide over zinc oxide ZnO. Processes are likewise known in which water is incorporated directly into the composition in the form of liquid water or hydrated calcium sulfate (BE 901 442) or hydrated aluminum trihydroxide (U.S. Pat. No. 4,549,041).

These processes are generally used to produce silane-crosslinked polyethylene foams by vaporization and expansion of the water present on the hydrates.

These processes apply poorly to the production of bulky articles, because the water generated in the transformation (e.g., mixing, shaping, or forming) equipment is able to react immediately with the silane polyethylene and result in premature crosslinking in the transformation equipment, consequently producing objects of lesser quality (deterioration of the gel under shear) in transformation conditions which are difficult to control. Furthermore, the products are made fragile by the presence of inorganic heterogeneities; and, furthermore, they exhibit high permeabilities to hydrocarbons, of the same magnitude as those of a conventional crosslinked polyethylene.

SUMMARY OF THE INVENTION

The preceding references, representative of the current state of industrial developments in the field of the crosslinking of polyethylenes, shows the need for formulation which would allow:

control of the crosslinking in the transformation tools and therefore the possibility of producing articles of great thickness; and rapid crosslinking kinetics in the presence of moisture and therefore a reduction in the time and costs of this operation.

The invention proposes such a crosslinkable composition, with a polyethylene base, characterized generally in that it comprises a major proportion, for example, 65 to 95%, preferably 75 to 95% by weight, of at least one polymer (a) selected from the silane-grafted polyethylenes (which will be designated below abbreviated by SCPE for silane crosslinkable polyethylene) or at least one ethylene-triethoxyvinylsilane copolymer, a minor proportion, for example, of 5 to 35, preferably 5 to 25% by weight, of at least one polymer (b) selected from the hydrophilic polymers which are incompatible with polymer (a) and, added to the total weight of polymers (a) and (b), a small proportion, for example, 1 to 10% by weight, of at least one polymer (c) selected from the copolymers and the terpolymers with an ethylene base able to react chemically with said polymer (b) (for example, during transformation by extrusion) and a catalytic proportion, for example, of 0.001 to 0.3% by weight, of at least one hydrolytic catalyst (d).

Polymer (a) can consist of a high, medium or low density polyethylene, for example 0.92 to 0.97, having a melt index of 0.1 to 400 (determined by standard ASTM D-1238), on which is grafted at least one silanated monomer responding to the general formula:

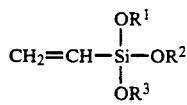

in which $R^1$, $R^2$ and $R^3$, identical or different, each represent an alkyl radical containing 1 to 22 carbon atoms. As examples of silanes of this type, vinyltriethoxysilane and vinyltrimethoxysilane can be cited.

Grafting can be performed according to usual processes such as the SIOPLAS process developed by the DOW-CORNING company and in which a mixture of polyethylene, peroxide and vinyltriethoxysilane is introduced in the hopper of the extruder preparing granules of silane-grafted polyethylene; or the MONOSIL process, developed by the MAILLEFER company and in which grafting of the vinyltriethoxysilane is performed by injection of peroxide and the vinyltriethoxysilane in the molten state in the sleeve of the screw for extruding the polyethylene to be grafted.

Hydrophilic polymer (b), incompatible with the ethylene polymers, can be selected from:

the usual polyamides such as those designated for $PA_n$ (with n from 4 to 12) and $PA_{pq}$ (with p and q from 4 to 10) and the various associated copolyamides;

the polyvinyl alcohols derived from vinyl acetate whose degree of hydrolysis of the ester patterns is 80 to 99.8%; and the vinyl alcohol-ethylene copolymers, in particular those whose proportion of patterns derived from ethylene ($-CH_2-CH_2-$) is less then 30% and whose melt flow index (ASTM D-1238) is from 1 to 5.

Polymer (c) in the compositions according to the invention can be selected from the copolymers formed from (i) ethylene and (ii) an acid or an aliphatic monocarboxylic ester with ethylenic unsaturation, such as, for example, acrylic acid or methacrylic acid or their alkyl esters of 1 to 22 carbon atoms or an acid, or ester or aliphatic dicarboxylic acid anhydride with ethylenic unsaturation, such as, for example, fumaric acid or maleic anhydride. Polymer (c) can also be selected from the terpolymers (statistical, sequenced or "comb-like") formed from ethylene, an alkyl acrylate or methacrylate of 1 to 22, preferably 1 to 8, carbon atoms and maleic anhydride or acrylic or methacrylic acid.

Particularly advantageous polymers, both copolymers and terpolymers, can be those whose general formula is as follows:

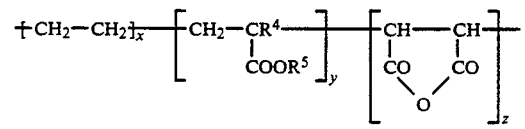

with $x+y+z=1$
$x=0.99$ to $0.50$
$y=0$ to $0.40$
$z=0.01$ to $0.1$
$R^4=H$ or $CH_3$
$R^5=$alkyl of $C_1$ to $C_{22}$, preferably $C_1$ to $C_8$ Hydrolytic catalyst (d) introduced in the compositions of the invention is generally dibutyltin dilaurate.

One of the advantages of the compositions according to the invention is precisely that they accept the introduction of a large amount of a crosslinking catalyst which accelerates the hydrolysis of the object produced, while making possible a control of the crosslinking of the SCPE during transformation.

When they are used in order to produce shaped objects, such as, for example, sections, tubes, containers, sheets, films, injection molded parts, etc . . . , the crosslinkable compositions of the invention, as described above, are used at temperatures above the highest melting point of their various components, for example, at temperatures of 140° to 260° C., by conventional shaping techniques such as extrusion, extrusion blow-molding or injection molding.

After shaping, the crosslinking by hydrolysis of the material is performed in the presence of liquid water or steam at a temperature of 70° to 105° C. The mechanism of the hydrolysis very likely stems from the water formed by reaction of hydrophilic polymer (b) with the silane-grafted polyethylene.

Be that as it may, this crosslinking exhibits more rapid kinetics than that of conventional silanated crosslinkable polyethylenes (SCPE). It is then possible within reasonable periods of time to crosslink objects having a relatively large thickness (up to about 20 mm). The objects thus produced, from compositions of the invention, exhibit a certain number of improved properties, more particularly:

amenability transformation;
impermeability to liquid or gaseous hydrocarbons;
good mechanical properties, and a good resistance to aging in a hydrocarbon medium under harsh conditions.

The following examples illustrate the invention without limiting it.

In these examples, several compositions have been prepared that have been subjected to transformation operations (extrusion or internal mixing) and to treatments (hydrolysis), as will be specified below. On the materials obtained, various determinations have been made to evaluate their properties.

The compositions presented under references 1 to 8, 10, 12 and 13 are studied by way of comparison; compositions 9, 11, 14 and 15 illustrate the invention.

The compositions by weight of the formulations studied are given in the various tables presented, in which SCPE, $PA_6$, $PA_{11}$ catalyst and EAM have the meanings below:

SCPE designates a silane-grafted polyethylene marketed by the ALPHACAN company.

$PA_6$ designates a polyamide 6 marketed by the RHONEPOULENC CHIMIE company under reference $PA_6$ C216 (registered trademark).

$PA_{11}$ designates a polyamide 11 marketed by the ATOCHEM company under reference RILSAN BESNO (registered trademark).

CH designates the hydrolytic catalyst which consists in a master blend containing 90% by weight of ethylene and 10% by weight of dibutyltin dilaurate;

EAM designates an ethylene terpolymer (89% by weight)—ethyl acrylate (8% by weight)—maleic anhydride (3% by weight), marketed by the ATOCHEM company under reference LOTADER 2200 (registered trademark).

EXAMPLE 1

TABLE 1

| Ref | FORMULATION (proportion by weight %) | TGT (%) | TGH (%) (H₂O, 70° C.) | Immersion time (hours) |
|---|---|---|---|---|
| 1 | SCPE | 30 | 50 after | 530 |
| 2 | SCPE—CH(0.5) | 55 | 70 after | 7 |
| 3 | SCPE—CH(1) | 60 | 70 after | 7 |
| 4 | SCPE—CH(2) | 64 | 70 after | 7 |
| 5 | SCPE—PA₆(10) | 20 | 40 after | 7 |
| 6 | SCPE—PA₆(10)—CH(2) | 35 | 70 after | 7 |
| 7 | SCPE—PA₆(20)—CH(2) | 40 | 70 after | 7 |
| 8 | SCPE—PA₆(16)—CH(2)—EAM(2.5) | 35 | 70 after | 7 |
| 9 | SCPE—PA₁₁(16)—CH(2)—EAM(2.5) | 30 | 70 after | 7 |

Formulations 1 to 9, whose composition is indicated in table I, have been formulated.

Each formulation is mixed in an internal mixer (registered trademark "RHEOCORD HAAKE" unit) at a temperature of 260° C. at a rotation speed of 32 rpm.

The gel rate after transformation (TGT in %) determined after 5 minutes of mixing and the gel rate after hydrolysis (TGH %) determined after immersion in water at 70° C. for a time t of the formulation after transformation account for the crosslinking of the composition in the stages being considered.

The gel ratios are determined by extraction in the xylene according to a method derived from ASTM D-2765 which provides:

weighing of 0.300 g of sample in a pleated metal filter;
immersion in xylene with the sample (140° C.) for 7 hours;
drying in a vacuum and weighing of the residue;
and calculation of the gel rate according to equation:

TG = (% residue − % PI)/% PS where PI and PS respectively represent the weight of the initial insoluble phase and the initial soluble phase in the sample examined.

After transformation, the SCPE exhibits a very slow crosslinking kinetics in the presence of water (reference 1). The incorporation of dibutyltin dilaurate into SCPE accelerates the crosslinking kinetics in the presence of water since after 7 hours of immersion at 70° C., the gel rate reaches 70%, which is the maximum accessible to this type of composition (references 2 to 4).

However, after transformation, these formulations show, a high gel ratio (TGT) and an increasing function of the catalyst content. Therefore, a considerable crosslinking is observed during the transformation which, if uncontrolled, can be detrimental for the transformation tools and the quality of the objects produced.

SCPE-PA catalyst formulations (references 6 to 9) exhibit, after transformation, a lower crosslinking rate (TGT) which is less than the conventional SCPE-catalyst formulations (in particular, compare with formulation 4). On the other hand, it is observed that under the same crosslinking conditions, in the presence of water at 70° C., the degree of crosslinking of the SCPE in SCPE-PA-catalyst mixtures is equal to the accessible optimum.

The presence of the polyamide therefore inhibits the action of the catalyst during the transformation, while maintaining rapid and complete crosslinking kinetics in water. The same type of observation can be made in the tests referenced 8 and 9 performed by incorporating in the mixtures terpolymers which are intended to improve their mechanical properties.

EXAMPLE 2

Mechanical tensile properties under traction at 20° C. of test pieces taken from tubes prepared by extrusion on a TROESTER extruder equipped with a type TS 45 screw were determined. The extrusions were made at 240° C. with a screw speed of 10 revolutions per minute, the tube die used having an outside diameter of 42 mm and an interstice of 3 mm. The crosslinking conditions are the same as in example 1 (namely immersion in water at 70° C. for 7 hours).

The traction test pieces of the ASTM 4 type are cut with a hollow punch from tubes in the longitudinal direction. The tensile tests are performed at 20° C. according to standard ASTM D638 (or NF T51-034). The results obtained are given in table 2.

TABLE 2

| Ref | FORMULATION (proportions %) | Modulus (MPa) | Threshold (MPa) | (%) | rupture (MPa) | (%) | TGT (%) | TGH (%) |
|---|---|---|---|---|---|---|---|---|
| 4 | SCPE—CH(2) | 400 | 20 | 17 | 17 | 300 | 60 | 70 |

TABLE 2-continued

| Ref | FORMULATION (proportions %) | Modulus (MPa) | Threshold (MPa) | Threshold (%) | rupture (MPa) | rupture (%) | TGT (%) | TGH (%) |
|---|---|---|---|---|---|---|---|---|
| 12 | SCPE—PA$_{11}$(30)—CH(2) | 450 | 20 | 18 | 16 | 70 | 35 | 70 |
| 11 | SCPE—PA$_{11}$(30)—CH(2)—EAM (2.5) | 530 | 23 | 25 | 24 | 260 | 30 | 70 |
| 10 | SCPE—PA$_{11}$(16)—CH(2) | 430 | 18 | 18 | 15 | 55 | 35 | 70 |
| 9 | SCPE—PA$_{11}$(16)—CH(2)—EAM (2.5) | 450 | 20 | 20 | 20 | 300 | 30 | 70 |

The results appearing in table 2 first of all confirm the observations of example 1. It then becomes evident that the introduction of ethylene-ethyl acrylate maleic-anhydride terpolymer, without reducing the gel rate after 7 hours hydrolysis at 70° C. in water, also reduces the gel rate after transformation, which is favorable for extruding under better conditions.

It also becomes evident that the mechanical properties of the formulations prepared with 16 and 30% polyamide in the presence of terpolymer are substantially improved. All in all, these formulations offer the best compromise between the suitability for transformation and mechanical properties under traction.

From formulations referenced 4, 11 and 12, extruded articles were prepared of which test pieces were subjected to aging under conditions selected to represent a fairly harsh petroleum medium. The test pieces are placed in turns in a liquid medium: petroleum, under a nitrogen atmosphere for a first period (A) of a week, then in a gaseous medium: methane for a second period (B) of a week and so on.

At the start of each week A, the medium is maintained at a temperature of 100° C. and at a pressure of 100 bars (10 MPa). After about 50 hours, the pressure was subjected to 10 reduced pressure/compression cycles between 100 bars (10 MPa) and 0, over a period of about 12 hours.

After about 110 hours, the pressure was restored to 0 and the temperature progressively lowered to 20° C. At the end of week A, (after 168 hours), the petroleum was drained off and the methane introduced. At the start of week B (second period of 168 hours), the medium (methane) was again raised to 100° C. and to a pressure of 100 bars (10 MPa). At the end of approximately 50 hours, the medium was again subjected to 10 reduced pressure/compression cycles between 100 bars and 0, over a period of approximately 12 hours. After about 110 hours, the excess pressure was returned to 0 and the temperature progressively lowered to about 20° C.

It is then possible to recommence a cycle comprising one week A and one week B.

At the end of the final cycle, the test pieces are removed. Their appearance is observed, and their absorption of fluid determined by weight (relative absorption: Δ %).

The results obtained with test pieces of materials produced from formulations 4, 11, 12 are given in table 3 below, as well as those obtained with a noncrosslinked polyethylene of density 0.950 (reference 13).

TABLE 3

| | 200 hours | | 600 hours | |
|---|---|---|---|---|
| Ref | Δ% | Remarks | Δ% | Remarks |
| 12 | 12.2 | blister surface | 12.0 | Deterioration |

TABLE 3-continued

| | 200 hours | | 600 hours | |
|---|---|---|---|---|
| Ref | Δ% | Remarks | Δ% | Remarks |
| 11 | 12.0 | NTR | 12.0 | NTR |
| 4 | 14 | NTR | 15 | NTR |
| 13 | 15 | NTR | 27 | Deterioration |

It appears clearly from this very harsh test that the terpolymer introduced in formulation 11 improves the cohesion of the material which is then no longer sensitive, under these test conditions, to the phenomenon of explosive decompression.

EXAMPLE 4

Measurements to ascertain permeability to n-heptane at 50° C. where conducted on samples taken from tubes extruded and crosslinked under the conditions described in example 2 from formulations described in table 4,

TABLE 4

| Ref | FORMULATION (proportions in % by weight) | Permeability (g/cm · sec) | TGT (%) | TGH (%) |
|---|---|---|---|---|
| 4 | SCPE—CH(2) | $7 \cdot 10^{-9}$ | 60 | 70 |
| 9 | SCPE—PA$_{11}$(16)—CH(2) EAM (2.5) | $1.1 \cdot 10^{-9}$ | 30 | 70 |
| 15 | SCPE—PA$_{11}$(20)—CH(2) EAM (2.5) | $8 \cdot 10^{-10}$ | 30 | 70 |
| 14 | SCPE—PA$_{11}$(25)—CH(2) EAM (2.5) | $2 \cdot 10^{-10}$ | 30 | 70 |
| 11 | SCPE—PA$_{11}$(30)—CH(2) EAM (2.5) | $5 \cdot 10^{-11}$ | 30 | 70 |

It is seen according to these results, the permeability is more reduced the higher the polyamide (PA$_{11}$) content Formulations 9, 11, 14 and 15 according to the invention therefore exhibit characteristics that are substantially improved compared with those of reference formulation 4. These improvements relate, on the one hand, to the physico-chemical properties such as permeability, the mechanical properties, on the other hand, the amenability to shaping by extrusion characterized by TGH-TGT. The introduction of polyamide and copolymer or terpolymer according to the invention seems to reduce the activity of the catalyst to transformation temperatures (reduction of TGT) without affecting the speed and the rate of crosslinking by hydrolysis after transformation (maintenance of TGH).

We claim:

1. A crosslinkable composition comprising an intimate mixture of:
   (a) a major proportion of at least one graft copolymer
      (a) selected from the group consisting of a trimethoxyvinylsilane graft copolymer of polyethylene and a triethoxyvinylsilane graft copolymer of polyethylene;
(b) a minor portion of at least one hydrophilic polymer (b) incompatible with said graft copolymer;
(c) a small proportion of at least one polymer wherein said polymer is a copolymer or terpolymer formed between (i) ethylene and (ii) at least one member selected from the group consisting of an aliphatic monocarboxylic acid with ethylene unsaturation, an alkyl ester of said monocarboxylic acid, an anhydride of said monocarboxylic acid, an aliphatic dicarboxylic acid with ethylene unsaturation, an alkyl ester of said dicarboxylic acid, and an anhydride of said dicarboxylic acid; and
(d) a catalytic proportion of at least one hydrolytic catalyst (d).

2. A composition according to claim 1, wherein said major proportion of (a) is 65 to 95% by weight, said minor proportion of (b) is 5 to 35% by weight, said small proportion of (c) is 1 to 7% by weight and said catalytic proportion of (d) is 0.001 to 0.3% by weight relative to all polymers (a) and (b).

3. A composition according to claim 2, wherein said major proportion of (a) is 75 to 95% by weight and said minor proportion of (b) is 5 to 25% by weight.

4. A composition according to claim 1, wherein said polymer (a) is a polyethylene having a density between 0.92 and 0.97, and a melt flow index, determined by ASTM D-1238, of 0.1 to 400, on which is grafted at least one silanated monomer of the general formula:

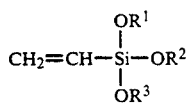

in which $R^1$, $R^2$ and $R^3$, identical or different, each represent an alkyl radical of 1 to 22 carbon atoms.

5. A composition according to claim 1, wherein said hydrophilic polymer (b), incompatible with the graft copolymer of ethylene, is selected from the group consisting of:
a polyamide designated $PA_n$, with n from 4 to 12, and $PA_{pq}$, with p and q from 4 to 10, and an associated copolyamide;
a polyvinyl alcohol derived from vinyl acetate whose degree of hydrolysis of is 80% to 99.8%; and
a vinyl alcohol-ethylene copolymer.

6. A composition according to claim 1, wherein said copolymer or terpolymer (c) is of the formula:

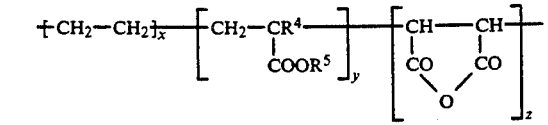

in which $x+y+z=1$, $x=0.99$ to $0.50$, $y=0$ to $0.40$, $z=0.01$ to $0.1$, $R^4=H$ or $CH_3$ and $R^5=$alkyl of $C_1$ to $C_{22}$.

7. Composition according to claim 1, wherein said hydrolytic catalyst (d) is dibutyltin dilaurate.

8. A shaped object produced by subjecting a composition according to claim 1 to transformation by extrusion, extrusion blow-molding or injection molding at a temperature between 140° C. and 260° C., the shaped composition then being crosslinked in the presence of water in the liquid or vapor phase at a temperature between 70° C. and 105° C.

9. A composition according to claim 5, wherein said hydrophilic polymer (b) is a polyamide $PA_n$, wherein n is from 4 to 12.

10. A composition according to claim 6, wherein said hydrophilic polymer (b) is a polyamide $PA_n$, wherein n is from 4 to 12.

11. A composition according to claim 10, wherein said major proportion of (a) is 65-95% by weight, said minor proportion of (b) is 5-35% by weight, said small proportion of (c) is 1-7% by weight, and said catalytic proportion of (d) is 0.001-0.3% by weight relative to all polymers (a) and (b).

12. A composition according to claim 11, wherein said major proportion of (a) is 75-95% by weight, and said minor proportion of (b) is 5-25% by weight.

13. A composition according to claim 5 wherein said major proportion of (a) is 65-95% by weight, said minor proportion of (b) is 5-35% by weight, said small proportion of (c) is 1-7% by weight, and said catalytic proportion of (d) is 0.001-0.3% by weight relative to all polymers (a) and (b).

14. A composition according to claim 13, wherein said major proportion of (a) is 75-95% by weight, and said minor proportion of (b) is 5-25% by weight.

15. A composition according to claim 1, wherein said composition is a molten blend.

16. A composition according to claim 1, wherein said intimate mixture is an intimate mixture of solid particulate components.

* * * * *